Oct. 18, 1955 C. LAVAL, JR Re. 24,076

APPARATUS ADAPTED TO PROVIDE PHOTOGRAPHIC RECORDS OF WELLS AND THE LIKE

Original Filed Feb. 13, 1950 4 Sheets-Sheet 1

CLAUDE LAVAL, JR.
INVENTOR
HUEBNER, BEEHLER, WORREL, HERZIG & CALDWELL
ATTORNEYS
BY Richard M. Worrel CLAUDE LAVAL, JR.
INVENTOR
HUEBNER, BEEHLER, WORREL,
HERZIG & CALDWELL
ATTORNEYS
BY Richard M. Worrel CLAUDE LAVAL, JR.
INVENTOR
HUEBNER, BEEHLER, WORREL,
HERZIG & CALDWELL
ATTORNEYS
BY Richard M. Worrel CLAUDE LAVAL, JR
INVENTOR
HUEBNER, BEEHLER, WORREL
HERZIG & CALDWELL
ATTORNEYS
BY Richard M. Worrel United States Patent Office Re. 24,076
Reissued Oct. 18, 1955

24,076

APPARATUS ADAPTED TO PROVIDE PHOTOGRAPHIC RECORDS OF WELLS AND THE LIKE

Claude Laval, Jr., Fresno, Calif.

Original No. 2,633,783, dated April 7, 1953, Serial No. 144,012, February 13, 1950. Application for reissue March 1, 1954, Serial No. 413,491

9 Claims. (Cl. 95—11)

Matter enclosed in heavy brackets [ ] appears in the original patent but forms no part of this reissue specification; matter printed in italics indicates the additions made by reissue.

The present invention relates to photographic apparatus and more particularly to such an apparatus adapted to provide photographic records of wells and the like.

Nationally publicized efforts to photograph ocean life at great depths have indicated some of the problems encountered in such photography by the recounting of the elaborate and expensive preparations therefor. These problems are seriously aggravated in the photographing of wells whether dry or filled with water, oil, or other liquid and have, it is believed, until the present invention precluded commercial photographing of wells and immersed objects generally.

Heretofore, it has been the practice when equipment has been lost in water or oil wells successively to drop a lead weight, or other malleable material such as beeswax or soap, onto the lost equipment and by observation of the imprint of the equipment on the material once retrieved to endeavor to determine the position and attitude thereof for grappling purposes. This crude approach is well-known in the art but unsuccessful in many instances. As a result of previous(ly) inability to determine the position, attitude, and the like of equipment lost in wells, many oil, gas and water wells each year are abandoned at a great waste of time, labor, equipment, and natural resources.

Of even greater significance, it has heretofore been impossible to photograph the casings of wells so as to detect defects therein as well as to determine the condition of perforations formed therethrough. After a well has been used for a considerable period of time, the casing perforations not infrequently become clogged requiring the reperforation of the portions of the casing through which liquid must pass. The device of the present invention not only permits the careful inspection of well casings and their perforations but also permits the evaluating of perforating operations performed thereon, thus not only can the condition of a well and its casing be accurately determined, but the efficacy of work performed thereon can be photographically recorded for study.

An object of the present invention is to provide permanent recordation of wells, well casings, and the like, which permit careful study to determine existing conditions, to detect defects, appropriately to plan corrective measures, and accurately to evaluate the results of the corrective measures taken.

Another object is to provide photographic records of wells and articles generally immersed in fluids, such as well casings; lost well equipment; sunken ships; ocean floor formations; submerged cables; walls and bottoms of fluid containers; oil, gas, and water pipe lines, and the like.

Another object is to provide stereoscopical photographic records of such articles.

Another object is to provide a photographic apparatus having improved features of remote control.

Another object is to provide an improved housing for fluid-immersed cameras.

Another object is to provide an improved photographic apparatus adapted for remote connection to a source of electrical energy and complete operational control by intermittent interruption of the electrical connection.

Another object is to provide a photographic apparatus having electrical means for advancing strip film therethrough in a predetermined increment of travel each time the means is energized, an electrical system for the film advancing means including means for storing electrical energy within the apparatus, and means responsive to the interruption of electrical supply to the apparatus providing flash photographic illumination from electrical energy accumulated in the storing means.

A further object is to provide an improved housing and window association in an apparatus of the character and for the purpose described adapted to flush dirt from the window by elevational movement of the apparatus through a fluid.

Still further objects and advantages will become apparent in the subsquent description of the specification.

Referring to the drawings.

Figure 5:
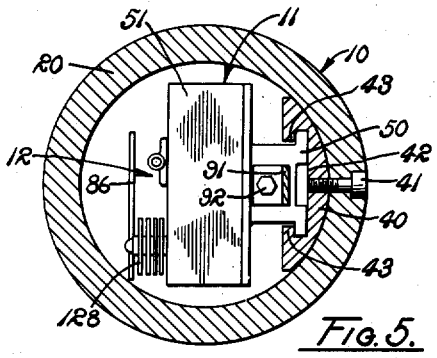
Figure 5 is a transverse section of the apparatus as taken on line 5—5 of Figure 1 showing the housing and camera mounted therein.

Referring in greater deatil to the drawings, the apparatus will be seen to comprise a novel association of a housing 10, a camera assembly 11, a film-advancing mechanism 12, a power pack 13, and an electric lamp 14. The numerals indicate general elements and assemblies subsequently described in detail. The housing 10 is fluid-tight and contains the camera 11 which is preferably of a constant-exposure strip-film type. The film-advancing mechanism 12 and the power pack 13 are jointly intermittently energized from a source of electrical energy, not shown, exteriorly of the housing. Provision is made for the advancement of film a predetermined increment of travel through the camera by the mechanism 12 each time the mechanism is energized whereupon the mechanism is stopped until electrical connection between the apparatus and the source of electrical energy is interrupted and subsequently reestablished. When electrical connection with the source of electrical energy is interrupted the power pack 13 is automatically in response thereto connected to the lamp for discharge therethrough. Reestablishment of connection of the apparatus to the source of electrical energy, again starts the film travel through the camera, disconnects the power pack from the source of illumination and reconnects the same to the source of electrical energy for recharging. As shown in Figure 5, the apparatus makes a compact unit which may be lowered into a well 15, or the like and which, as will soon become apparent operates dependably in either immersed or emersed condition.

HOUSING

The body of the housing 10 is preferably a hollow cylindrical pipe-like portion 20 having a transversely flush head end and an opposite male screw-threaded end. A circular inner head plate 21 is fitted on the head end of the portion 20 in fluid-tight engagement. Sealing gaskets, not shown, may be employed between the portion 20 and inner head plate 21, if desired. A circular outer head plate 22 overlays the head plate 21 and the peripheries of the two plates endwardly rounded to provide a generally streamlined effect. The plates are held in position by socket-headed cap screws 23 extended therethrough and engaged in the body portion 20. A pair of spaced bores 24 are formed axially through the plates 21 and 22 and have windows 25 mounted therein.

Figure 2:
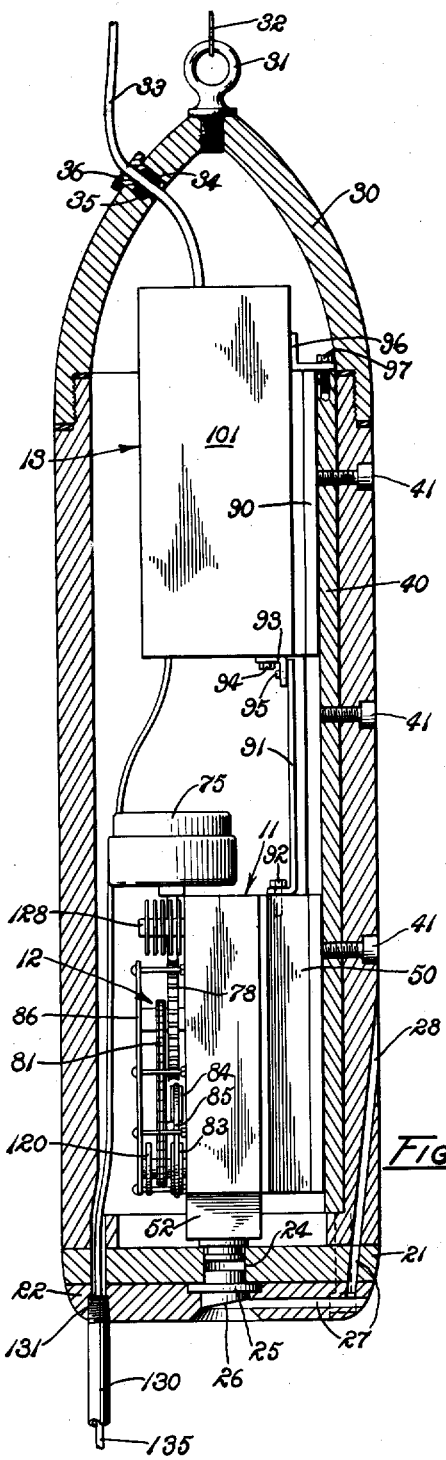
Figure 2 is an enlarged longitudinal section of the photographic apparatus shown in Figure 1 having a lamp-bearing arm thereof broken off for illustrative convenience.

As shown in Figure 2, the windows conveniently provide cylindrical portions fitted to the portions of the bore in each of the plates and a circumscribing flange which is held between the plates in a counter-bore in fluid-tight engagement. Each of the windows has transversely slanted endwardly disposed surfaces so that as the apparatus is moved endwardly through fluid, the fluid in which it is immersed impinges on the windows and tends to flush dirt therefrom. A conduit 27 is formed in the housing in communication with the bores adjacent to the upper edge of each of the slanted surfaces of the windows, is directed radially of the plate 22 and thence upwardly of the portion 20 to a port 28 in the periphery of said portion.

A streamlined generally paraboloidal upper end 30 is screw-threadably mounted on the upper end of the portion 20 in fluid-tight engagement therewith. A supporting eyelet 31 is mounted axially in the end 30 and provides dependent support on a cable 32, or other suitable supporting device, connected thereto. An electric supply cable 33 furnishes electrical energy to the camera assembly 11, film-advancing mechanism 12, power pack 13, and indirectly to the electric lamp 14. For passage of the cable through the end 30, an aperture 34 is formed therein through which the cable extends. Fluid tight integrity is assured by providing the aperture with an outer counter-bore receiving packing 35 tightened into place by a packing bushing 36 screw-threadably mounted in the counter-bore.

Figure 4:
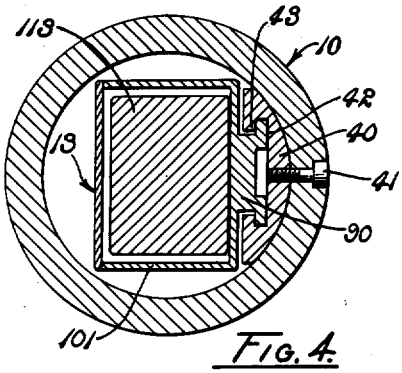
Figure 4 is a transverse section of the apparatus, revealing the cylindrical character of the housing and means for mounting a power pack therein, as taken on line 4—4 of Figure 1.

As a mounting convenience for the camera assembly 11, film-advancing mechanism 12, and power pack 13, a part cylindrical base 40, as shown in Figures 2, 4, and 5 is fitted to the interior of the central portion 20 of the housing 10 and secured longitudinally in said portion as by socket headed bolts 41 passed through the wall of the portion 20 and screw-threaded into the base. Said base conveniently provides a longitudinal channel 42 having inturned edges 43.

CAMERA ASSEMBLY

The camera assembly 11 is conveniently mounted in the housing on a bracket 50 slidably received in the channel 42 of the base 40. For convenience in mounting and protecting the elements of the camera, a case 51 is provided, as shown. A lens holder 52 is provided on the case 51 in alignment with the bores 24 and serves to mount lenses 53 in alignment with the bores. The lenses have focal points within the housing 10 preferably just inside the case 51.

A film supply reel 56 is rotatably mounted in the case 51 as at 57. The reel and mounting preferably provide a slight braking action or frictional resistance to rotation of the reel to avoid excessive unwinding during operation of the apparatus. A winding reel 58 is rotatably mounted in the case as on a rotatable shaft 59. Guide spools 60 and 61 assist in the well known manner in directing film, represented at 62 from the supply reel to the winding reel by way of the focal points of the lenses.

Figure 6:
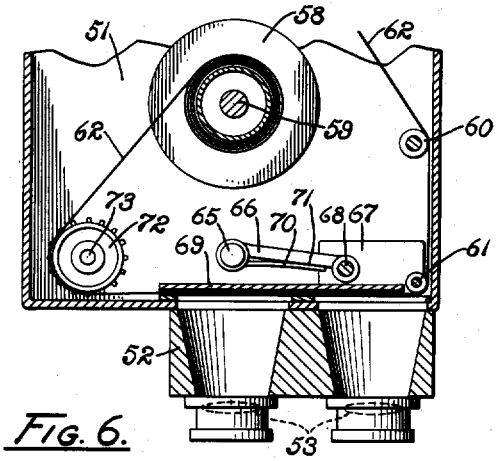
Figure 6 is an enlarged fragmentary longitudinal section of a camera employed in the apparatus.
Figure 7:
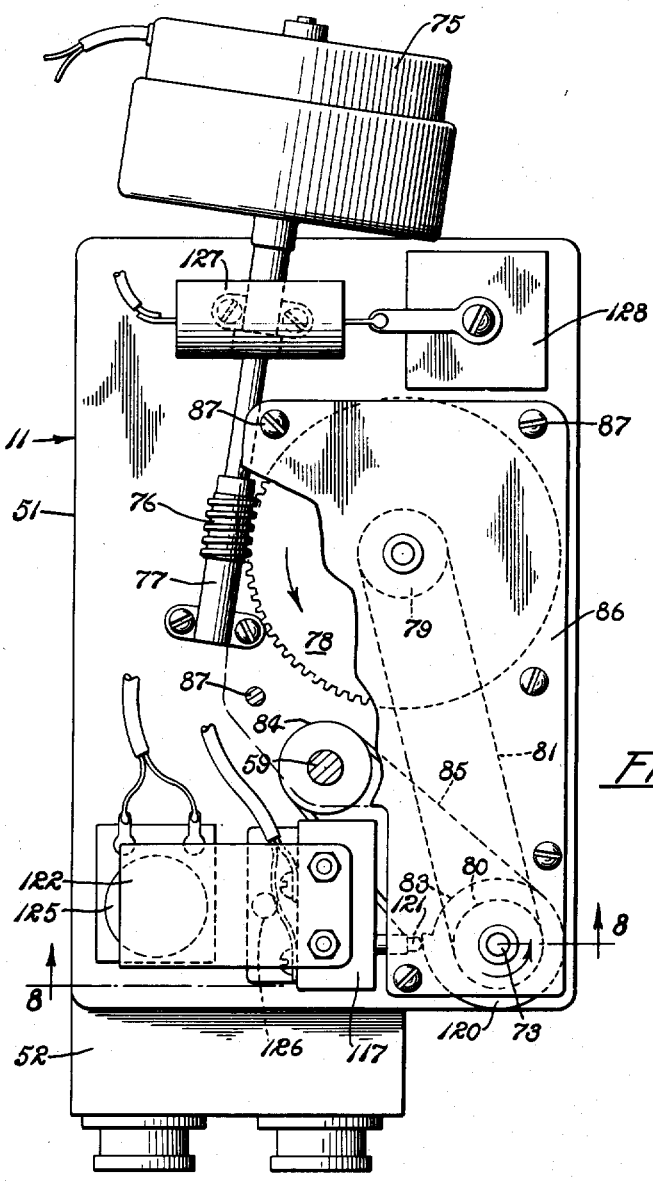
Figure 7 is an enlarged side elevation, with a cover portion broken away, of the camera and film-advancing motor employed therewith.

In order dependably to maintain the film at the focal points of the lenses, a pin 65 is fixedly mounted in the case 51. An arm 66 is radially extended from the pin for pivotal movement thereabout. A pair of guides 67 are pivotally mounted on the extended end of the arm 66, as on a pin 68. The guides 67 are interconnected by a slide plate 69 adapted to overlay the film as it is traveled past the lenses. The slide plate 69 is opaque and blocks admission of light to the case 51 through the film. A leaf spring 70 is fastened to the arm 66, as at 71, and operates against a flat provided on the pin 65 so as to urge pivotal movement of the arm 66 toward the frame. This structure is clearly evident in Figures 3 and 6. A sprocket 72 is mounted on an axle 73 journaled in the case 51 in a position to draw the film 62 past the lenses 53 by engagement of teeth of the sprocket with the well-known driving perforations in the film.

FILM-ADVANCING MECHANISM

The film-advancing mechanism 12 employs a motor 75 conveniently mounted on the case 51. A worm 76 is rotatably mounted on the case, as at 77, and has driven connection with the motor. A worm wheel 78 is rotatably mounted on the case 51 and meshes with the worm gear 76. A cog wheel 79 is mounted concentrically with the worm wheel 78 for unitary rotational movement therewith. A driven cog wheel 80 is fixedly mounted on the axle 73. A drive chain 81 provides driving interconnection between the cog wheels 79 and 80 and translates rotation of the worm wheel 78 into rotation of the timing sprocket 72.

Figure 3:
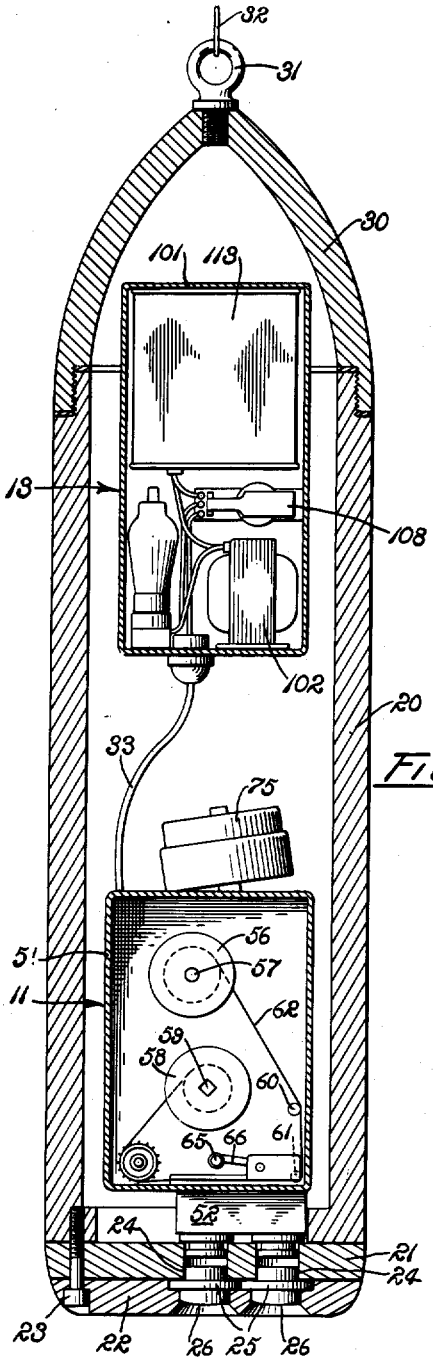
Figure 3 is a longitudinal section of the photographic apparatus shown in Figure 2 viewed from a plane substantially ninety degrees displaced therefrom as taken along line 3—3 of Figure 1.

A pulley 83 is fixedly mounted on the axle 73. A winding pulley 84 is fixedly mounted on the shaft 59 and a spring belt 85 provided about the pulleys 83 and 84 for driving interconnection. When the motor is energized, as soon described, the worm 76 rotates the worm wheel 78 and the chain 81 rotates the sprocket 72. The spring belt 85 rotates the winding reel 58 taking up the film 62 as it is fed past the lenses 53 by the sprocket 72. The spring belt provides the usual resilient drive employed in cameras to accommodate the varied circumference of the film progressively wound on or unwound from the reel. As shown in Figure 3, the film 62 is drawn from the supply reel 56 past the guide spools 60 and 61, between the guides 67, and under the plate 69. The film meshes with teeth on the sprocket 72 in the usual way and after passing the sprocket is taken on the rotated winding reel 58. It will be noted that the camera is of the constant exposure or shutterless type and receives illumination when the film is stationary for exposure thereof. A protective covering plate 86 is mounted, as by cap screws 87, on the side of the case 51 in covering relation to the worm wheel 78 and portions of the driving mechanism driven thereby.

POWER PACK

As shown in Figure 4, the power pack 13 is conveniently mounted in the housing by means of a bracket 90, similar to the camera bracket 50, slidably received in the channel 42 of the base 40. A spacer 91 is connected to the camera bracket 50 by means of a bolt 92, as shown in Figure 2. An angle bracket 93 is similarly connected to the bracket 90 by means of a bolt 94. A stud 95 on the end of the spacer 91 engages in an opening in the angle bracket 93 and provides releasable interconnection therebetween. So associated, the camera assembly 11 and power pack 13 may be conveniently slid in and out of the housing upon removal of the end 30. The power pack is readily disconnected from the spacer 91 by disengaging the angle bracket 93 from the stud 95. When the camera assembly and power pack are in the housing, the spacer 91 provides dependable relative positioning thereof. A stop 96 is weldably, or otherwise, secured to the bracket 90 in a position to abut the upper end of the base 40 when the lenses 53 are in proper position in the bores 24. The stop is locked in position by means of a bolt 97 passed through the stop and screw-threadably engaged to the base. The bolt 97 is readily accessible for removal upon removal of the end 30 of the housing 10.

Figure 10:
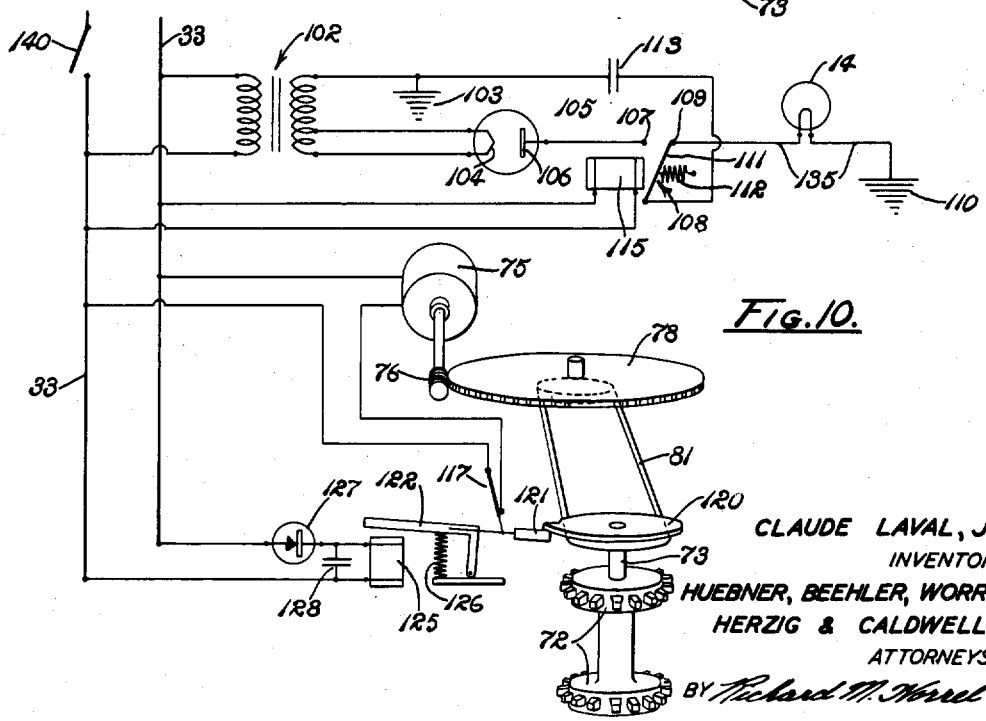
Figure 10 is a combined wiring diagram of the electrical system employed in the subject apparatus with a schematic representation of the film-advancing means operated thereby.

A power pack case 101 is mounted on the bracket 90 and provides a secondary housing for power pack elements soon described. A transformer 102 is mounted within the power pack case 101 and connected to a source of electrical energy, not shown, externally of the housing by means of the supply cable 33. As shown in Figures 3 and 10, one side of the secondary of the transformer 102 is grounded, as at 103, to the housing 10. The cathode 104 of a rectifier tube 105 is connected to the secondary of the transformer 102, as shown. The plate 106 of the rectifier tube is connected to one pole 107 of a two-way switch 108. The two-way switch provides an opposite pole 109 connected to the lamp 14 which is in turn grounded to the housing 10, as at 110. The lamp is preferably of any of the many well known types accommodating extremely high voltages for very short durations to produce brilliant flashes of light. Inasmuch as the lamp is used many times it preferably possesses relatively stable spectrum and electrical stability. The two-way switch has a movable contact 111 resiliently urged as by a spring 112 into engagement with the pole 109. The contact is grounded, as at 103, through a condenser 113.

An electromagnetic relay 115 is connected to the source of electrical energy in parallel to the transformer 102, by the cable 33. The relay is arranged to draw the contact 111 of the two-way switch 108 from engagement with the pole 109 into engagement with the pole 107.

Figure 8:
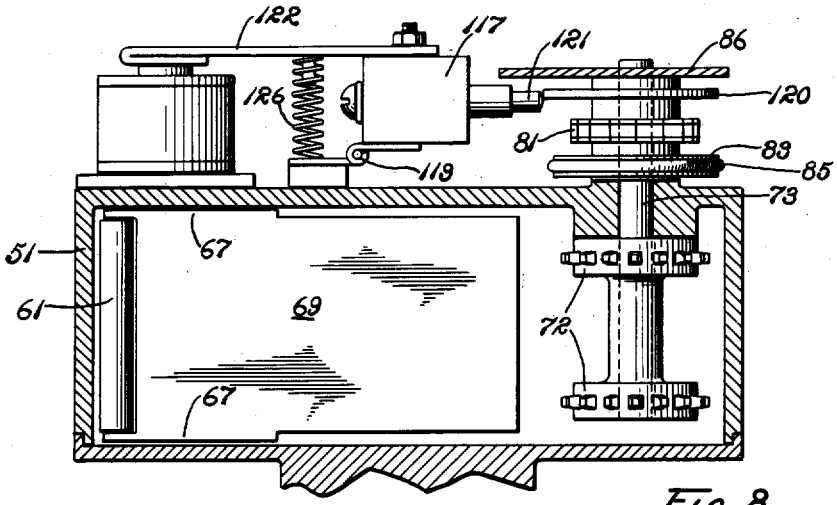
Figure 8 is a transverse section of the camera and a switch control means for the film-advancing motor as taken on line 8—8 of Figure 7.

The motor 75 is connected in electrical series with a motor control switch 117 and said motor and switch in electrical parallel with the transformer 102 and relay 115. A microswitch conveniently serves the purpose of the control switch 117 and is pivotally mounted on the camera case 51, as at 119, in Figures 8 and 9. A timing cam 120 having the form shown in Figure 10 providing a somewhat helical periphery progressing from a point of minimum radial extension to a point nearly 360 degrees therefrom of maximum radial extension is fixedly mounted on the axle 73. The control switch 117 has an operating member 121 extended for peripheral engagement with the cam 120. The association of the cam and member is such that the switch 117 is opened by traversal of the point of maximum radial extension of the cam and is automatically closed by the inherent characteristics of the switch when the member traverses portions of the cam of substantially less than maximum radial extension.

Figure 9:
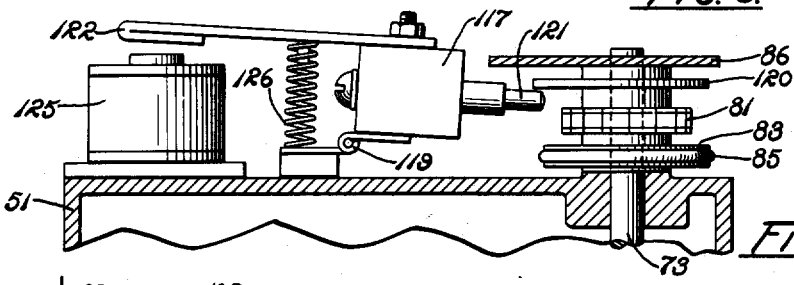
Figure 9 is a fragmentary portion of the structure shown in Figure 8 illustrating the position the switch control means assumed upon interruption of electrical current to the apparatus.

A control arm 122 is rigidly extended from the switch and provides controlled pivotal positioning thereof. An electromagnet 125 is mounted on the case 51 and adjacent to the extended end of the control arm 122 and when energized draws the arm theretoward urging the switch 117 into a position bringing the member 121 into engagement with the periphery of the cam. A helical compression spring 126 is mounted under initial compression between the case 51 and the arm 122 in opposition to the effect of the electromagnet. When the electromagnet is energized the switch assumes the position shown in Figure 8. When the electromagnet is deenergized the compression spring 126 tips the motor control switch 117 and removes the member 121 from peripheral cam engagement, as shown in Figure 9. It is significant that once the switch is tipped from engagement with the periphery of the cam at the point of maximum radial extension, it can not be returned to peripheral engagement even upon energizing of the electromagnet 125 until the cam is rotated from said position. This is demonstrated in Figures 9 and 10. Inasmuch as the apparatus is usually operated at locations in which 110 volt power supplies are available, the transformer 102 is employed as described. The electromagnet is connected to the source of electrical energy; in parallel to the transformer, the relay 115, and the motor 75 and control switch 117; in series with a selenium, or other suitable rectifier 127. A condenser 128 is connected electrically in series with the rectifier 127 and in parallel with the electromagnet 125.

ILLUMINATION

Figure 1:
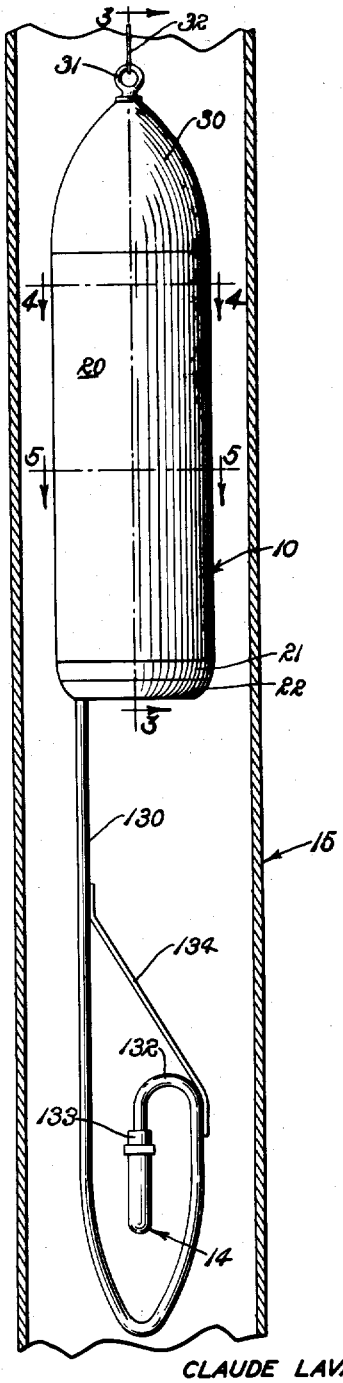
Figure 1 is a fragmentary longitudinal section of a well showing in side elevation a photographic apparatus of the present invention suspended in the well.

Because the apparatus is frequently employed to photograph in oil, dirty water, and the like, it has been found preferable to mount the lamp 14 inwardly spaced from the head of the apparatus. This is conveniently accomplished by means of a conduit 130 screw-threadably mounted in the outer head plate 22, as at 131 in Figure 2, which is endwardly extended, formed into a generally parabolic return-bend and provided with a U-shaped terminal end 132 mounting a fluid-tight lamp socket 133. The parabolic return-bend in the conduit assists in guiding the apparatus downwardly in a well through obstructions frequently encountered therein. To preclude snagging of the conduit on such obstructions, a glide arm 134 is welded to the conduit 130 adjacent to the housing and endwardly extended for tangential engagement with the U-shaped terminal end 132, as shown in Figure 1. Electrical connection is made between the pole 109 and the lamp 14 mounted in the socket 133 and between said lamp and the ground 110 by means of a pair of wires 135 threaded through the conduit.

Complete control of the apparatus to advance the film 62, to terminate the film advance after a predetermined drive of the film, to charge the condenser 113, and to flash the lamp 14 is achieved by intermittent connection of the conduit 33 to a source of electrical energy. This intermittent connection is conveniently achieved by the operation of a master control switch 140 or other suitable means preferably provided in the cable 33 remote from the apparatus.

OPERATION

The operation of the apparatus of the present invention is believed to be clearly apparent and is briefly summarized at this point. The apparatus is lowered into a well 15 or other place to be photographed by means of the support cable 32. This may be done by hand, windlass, or any well known means but one which preferably gives an indication of the depth of the apparatus at all times.

When the apparatus is lowered to the desired depth at which the photographic record is to be started, the switch 140 is closed energizing the primary of the transformer 102, the motor 75, and the electromagnet 125 drawing the switch 117 into position for operation of the cam 120 against the operating member 121. The motor travels the film, as previously described from the supply reel 56 to the winding reel 58 by way of the focal points of the lenses 53. The speed of rotation of the cam is such that when the film has traveled a sufficient distance to bring unexposed film into alignment with the lenses, the control switch 117 is opened by cam 120 stopping the motor. During this time and subsequently as long as the master control switch 140 is closed, the condenser 113 is connected to the source of power for charging purposes. When it is desired to expose the film, the master control switch 140 is opened interrupting current flow to the relay 115 whereupon the contact 111 is urged from the pole 107 into engagement with the pole 109 discharging the condenser 113 through the lamp 14 to the ground 110 and exposing the film upon flash of the lamp. Concurrently with opening of the master control switch 140 the electromagnet 125 is de-energized releasing the control arm 122 for pivotal movement of the switch 117 under the urging of the spring 126 to the position shown in Figure 9 with the switch 117 closed and the member 121 latched under the cam 120. The electrical system is thus preconditioned for the closing of the master control switch 140 and successive photographic operations.

In most instances after each exposure of the film, the apparatus is either raised or lowered a measured distance so that a sequence of photographs provides a continuous record of the well or other photographed objects. Innumerable photographs in such sequential and repetitive order as desired may be taken without removing the device from the well or other operational environment. Upon closing of the switch 140, the electromagnet 125 is energized but can not return the switch 117 to the position shown in Figure 8 until after the motor 75 has moved the timing cam 120 a sufficient distance so that the member 121 may move upwardly into engagement with the periphery of the cam. The succeeding photograph is made by opening the master control switch 140, as previously described. After the last of a series of photographs is taken, the switch 140 is closed so that the exposed film is traveled from the lenses to positions not accessible to the light.

It is apparent that the spaced lenses provide stereoscopical airs of photographs which when viewed through a conventional stereoscope give depth perception to the photograph record prepared. It will be obvious that a single lens may be employed in the device of the present invention instead of the pair of lenses where depth perception in the resultant photographic record is not desired and, of course either color or black and white film may be used.

The housing 10, as described, is hermetically sealed and upon employment of a properly insulated cable 33 the apparatus is safely used in oil, gas, gasoline, and other inflammable fluids. Movement of the apparatus upwardly or downwardly through a liquid causes a flow of the liquid through the conduit 27 and across the windows 25 to flush dirt, air bubbles and the like therefrom.

The streamlined exterior of the housing and the particular shape given to the conduit 130 and guide arm 134 minimize snagging of the apparatus during lowering or raising of the same. It is to be observed that the apparatus is not limited to use in the erect position described supported on the cable 32 but finds many uses in other attitudes and positions such as when pulled or pushed through pipe lines and the like.

In actual operation the apparatus has proved dependable, easy to control, convenient to operate, and capable of providing detailed photographic records of wells and the like obviating the abandonment thereof and concomitant expense and waste of natural resources heretofore resultant from an inability closely to examine the same.

Although I have herein shown and described by invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and systems.

Having described my invention, what I claim as new and desire to secure by Letters Patent is:

1. In an apparatus for photographing wells and the like the combination of a camera, an electric motor having driving connection to the camera for advancing film through the camera a predetermined increment of travel each time said motor is energized, an electrical system connected to the motor and having provision for intermittent connection to a source of electrical energy, a condenser *in the system charged by energization of the system*, an electric photographic lamp, *the system having a predetermined electrical path therethrough from the condenser to the lamp*, a [two-way] switch [arranged alternately to connect the condenser to the system to charge the condenser and to the lamp for discharge therethrough,] *in controlling connection to the path having a lamp actuating position which renders the path conductive and a non-actuating position, means resiliently urging the switch into actuating position*, and a relay in the system having controlling connection to the switch so as [to connect the condenser to the system] *to move the switch to non-actuating position* when the system is energized and to [connect the condenser to the lamp] *release the switch to actuating position* when the system is de-energized.

2. An apparatus for photographing wells and the like comprising a substantially fluid-tight housing, a lens mounted in the housing and having a focal point within the housing, an electrical motor for advancing film past the focal point of the lens, an electrical system having connection to a source of electrical energy exteriorly of the housing and to the motor, a master switch in series with the motor in said system, a control switch in series with the motor, a timing means having driven connection with the motor and releasable controlling engagement with the control switch adapted to open the control switch after a predetermined increment of travel of the motor, resilient means urging the control switch [into] *from* controlled engagement with the timing means, an electromagnet connected in parallel with the motor and control switch to the electrical system adapted to urge the control switch into controlled engagement with the timing means, a condenser in the housing *charged by energization of the system*, an electric lamp borne by the housing arranged to illuminate an area exteriorly of the lens, *the system having a predetermined electrical path therethrough from the condenser to the lamp*, [a two-way] *an automatic* switch [connected to the condenser for alternate electrical connection with the electrical system and the lamp], *in controlling connection to the path having a lamp actuating position which renders the path conductive and a non-actuating position, said switch being resiliently urged into actuating position* and an electromagnet connected to the system in parallel with the motor and arranged in controlling relation to the [two-way] switch [for connecting the condenser to the system] *to move the switch to non-actuating position* when the system is energized and [the lamp] *to release the switch to actuating position* when the system is not energized.

3. A well camera comprising a substantially fluid tight housing having an opening formed therein, a lens mounted in *alignment with* the opening having a focal point within the housing, electrically driven means for advancing film past the focal point of the lens, an electric system adapted for intermittent connection to a source of electrical energy exteriorly of the housing and to the electrically driven means, said system including a control switch in series with the driven means, a timer motivated by the driven means and having controlling engagement with the control switch adapted automatically to open the control switch after a predetermined increment of travel of the driven means each time the system is energized, an arm extended from the housing, an electric lamp borne by the arm in spaced relation to the opening in the housing, a condenser within the housing *charged by energization of the system*, and an electrically controlled switch means connected electrically in parallel with the driven means to the system [and electrically connecting the condenser to the system when the system is energized and to the lamp for discharge therethrough when the system is de-energized.] *, said switch means having a predetermined electrical path therethrough from the condenser to the lamp and having a first condition in which the path is non-conductive, said path being rendered conductive by de-energization of the system for discharge of the condenser through the lamp.*

4. An apparatus for photographing wells and the like comprising a housing having [an opening formed] *a window* therein, a lens mounted in [the opening] *alignment with the window* having a focal point within the housing, means for advancing strip film past the focal point of the lens, an electrical system connected to the film-advancing means and having provision for intermittent connection to a source of electrical energy exteriorly of the housing, an electric photographic lamp mounted on the housing for illumination of an area exteriorly thereof, a condenser mounted within the housing *charged by energization of the system,* a [two-way] switch mounted within the housing [adapted alternately to connect the condenser to the system and to] *and having electrical connection to the system, the system having a predetermined electrical path therethrough from the condenser through* the lamp *and the switch having controlling connection to the path and providing a lamp actuating position and a non-actuating position,* resilient means urging the [two-way] switch into *actuating* position [connecting the condenser to the lamp], and a relay in the electrical system arranged to position the switch [to connect the condenser to the system] *in non-actuating position* when the system is energized.

5. The combination of a camera adapted to have strip film passed therethrough, an electric motor having driving connection to the camera for advancing film therethrough, an electric circuit connecting the motor to a source of electrical energy, a master control switch in the circuit in series with the motor, an electrical condenser *charged by the circuit,* an electrically energized light source for exposing the film, *the circuit having a predetermined electrical path therethrough from the condenser through the light source,* [a two-way] *an automatic* switch [adapted alternately to connect the condenser to the circuit in parallel relation to the motor and the condenser to the lamp] *in the circuit having controlling connection to the path providing a first position in which the path is non-conductive and a second position in which said path is rendered conductive,* resilient means urging the [two-way] *automatic* switch into its *second* position [connecting the condenser to the lamp], and an electro-magnet electrically in series with the master control switch in the circuit [mechanically connected to the two-way] *having controlling association with the automatic* switch [in opposition to the resilient means] adapted to urge the [two-way] *automatic* switch into its *first* position [connecting the condenser to the circuit when the master control switch is closed] *when said electro-magnet is energized.*

6. An apparatus for photographing wells and the like comprising a constant exposure strip film camera, a substantially fluid tight housing for the camera adapted to admit light thereto, electrical means having driving connection to the camera for advancing strip film through the camera, means for storing electrical energy, an electrical circuit including the driving means and the electrical storing means connected electrically in parallel, means for alternately connecting and disconnecting the circuit to a source of electrical energy, an electric lamp mounted on the housing to illuminate an area exteriorly thereof, *the circuit having a predetermined electrical path therethrough from the storing means through the lamp,* and switch means [for disconnecting the storage means from the circuit and connecting said storage means to the lamp automatically] *in the circuit having controlling connection to the path rendering said path conductive* in response to disconnection of the electrical circuit from the source of electrical energy and for [disconnecting the storage means from the lamp and connecting said storage means to the circuit] *rendering the path non-conductive* in response to connection of the electrical circuit to the source of electrical energy.

7. An apparatus for photographing wells and the like comprising a shutterless strip film camera, a substantially fluid tight housing for the camera, electrical means within the housing for advancing strip film through the camera, a condenser mounted within the housing, an electric lamp mounted on the housing to illuminate an area externally of the housing adjacent to the camera, an electrical circuit connecting the film advancing means to a source of electrical energy exteriorly of the housing *and supplying charging current to the condenser in the housing,* a master control switch exteriorly of the housing connected in the circuit in series with the advancing means, a normally closed control switch connected between the master control switch and the film advancing means in the circuit, means for opening the control switch in response to predetermined travel of the film advancing means, *the circuit having a predetermined path therethrough from the condenser through the lamp for discharge of the condenser through the lamp* and switch means responsive to opening and closing of the master switch [connecting the condenser electrically in parallel with the control switch and film advancing means in the circuit in response to closing of the master control switch and disconnecting the condenser from the circuit and connecting it to the lamp in response to opening of the master control switch] *in controlling association with the path having a lamp actuating position which it assumes when the master switch is opened and a non-actuating position which it assumes when the master switch is closed.*

8. An apparatus for photographing wells and the like comprising a shutterless camera adapted to have strip film passed therethrough, a substantially fluid tight housing encasing the camera and having a window therein to admit light to the camera, an electrical motor within the housing having driving connection to the camera for advancing strip film through the camera, an electric lamp mounted on the housing and arranged to illuminate an area exteriorly of the housing adjacent to the window, a condenser mounted within the housing, an electrical circuit connecting the motor to a source of electrical energy exteriorly of the housing *and supplying charging current to the condenser, said circuit having a path therethrough from the condenser through the lamp,* a master control switch connected electrically in series with the motor in the circuit, [a two-way] *an automatic* switch [adapted alternately to connect the condenser to the circuit in parallel relation to the motor and the condenser to the lamp] *in controlling association with the path having a lamp actuating position which renders the path conductive and a non-actuating position,* resilient means urging the *automatic* switch into its *actuating* position [connecting the condenser to the lamp], and an electro-magnet electrically in series with the master control switch in the circuit [connected to the two-way switch in opposition to the resilient means adapted to urge the two-way switch into its position connecting the condenser to the circuit] *urging the automatic switch into non-actuating position* when the master control switch is closed.

9. In a photographic apparatus the combination of a lens having a focal point, electrically motivated means for advancing film past the focal point of the lens, an electrical system having connection to a source of electrical energy and to the film advancing means, a master switch in series with the film advancing means, a normally closed control switch in series with the motor, a timing means having driven connection to the film advancing means and controlling engagement with the control switch adapted to open the control switch after a predetermined increment of travel of the film advancing means, a condenser *charged by the system*, an electric lamp, [a two-way] *an automatic* switch [connected to the condenser for alternate electrical connection of the condenser to the electrical circuit in parallel to the advancing means and to the lamp] *in the system having an actuating position in which it is adapted to establish an electrical path from the condenser through the lamp and an alternate non-actuating position*, and an electro-magnet connected to the circuit in parallel with the advancing means and arranged in controlling relation to the [two-way] *automatic* switch for [connecting the condenser to the circuit when the circuit is energized and to the lamp] *placing the automatic switch in actuating position* when the circuit is de-energized.

References Cited in the file of this patent or the original patent

UNITED STATES PATENTS

| | | |
|---|---|---|
| 818,489 | Trapp | Apr. 24, 1906 |
| 1,090,413 | Rhodes | Mar. 17, 1914 |
| 1,331,627 | Dilts | Feb. 24, 1920 |
| 1,939,332 | Bouwers et al. | Dec. 12, 1933 |
| 2,093,128 | Hewitt et al. | Sept. 14, 1937 |
| 2,125,388 | Monroe | Aug. 2, 1938 |
| 2,338,028 | Doll | Dec. 28, 1943 |
| 2,338,029 | Doll | Dec. 28, 1943 |
| 2,341,745 | Silvermann et al. | Feb. 15, 1944 |
| 2,424,276 | Johnson et al. | July 22, 1947 |
| 2,464,389 | Grau | Mar. 15, 1949 |